(12) United States Patent
Mott et al.

(10) Patent No.: US 9,901,031 B2
(45) Date of Patent: Feb. 27, 2018

(54) AUTOMATIC TUNING OF AN INTELLIGENT COMBINE

(71) Applicant: Deere & Company, Moline, IL (US)

(72) Inventors: Cameron R. Mott, San Antonio, TX (US); Timothy S. Hunt, Davenport, IA (US); Aaron J. Bruns, Bettendorf, IA (US); Anja Eggerl, Dresden (DE); Bhanu Kiran Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 148 days.

(21) Appl. No.: 14/495,734

(22) Filed: Sep. 24, 2014

(65) Prior Publication Data

US 2016/0081271 A1   Mar. 24, 2016

(51) Int. Cl.
*A01D 41/127* (2006.01)
*G05B 15/02* (2006.01)

(52) U.S. Cl.
CPC ....... *A01D 41/1274* (2013.01); *A01D 41/127* (2013.01); *A01D 41/1276* (2013.01); *A01D 41/1277* (2013.01); *G05B 15/02* (2013.01)

(58) Field of Classification Search
CPC .............. A01D 41/127; A01D 41/1271; A01D 41/1272; A01D 41/1273; A01D 41/1274;

(Continued)

(56) References Cited

U.S. PATENT DOCUMENTS 4,934,985 A * 6/1990 Strubbe ................ A01D 41/127
460/4
5,666,793 A * 9/1997 Bottinger ............. A01B 79/005
460/1

(Continued)

OTHER PUBLICATIONS

European Search Report in foreign counterpart application No. 15182553.6 dated Mar. 9, 2016 (6 pages).

*Primary Examiner* — Thomas G Black
*Assistant Examiner* — Sara J Lewandroski
(74) *Attorney, Agent, or Firm* — Rathe Lindenbaum LLP (57) ABSTRACT

A method for automatically tuning an agricultural combine (100), comprises the steps of: receiving (304) a signal from an operator of the agricultural combine (100) indicating that current operation of the agricultural combine (100) operation is acceptable; determining (306) current performance parameters of the agricultural combine after the step of receiving; calculating (310) a performance parameter error limit for each of the current performance parameters in the step of determining; again determining (312) current performance parameters; comparing (314) the again determined current performance parameters with the performance parameter error limits to thereby determine whether one or more of the again determined current performance parameters falls outside its associated performance parameter error limit; and if at least one of the again determined current performance parameters falls outside its associated performance parameter error limit, then calculating (316) changes to machine settings of the agricultural combine (100) that will bring the at least one of the again determined current performance parameters back within its associated performance parameter error limit.

11 Claims, 3 Drawing Sheets

(58) Field of Classification Search
CPC ............ A01D 41/1275; A01D 41/1277; A01D 34/006; A01D 34/008; A01D 46/085; A01D 41/00; A01D 41/1276; A01D 41/1278; Y10S 460/00; Y10S 460/901; Y10S 460/902; Y10S 460/903; Y10S 460/904; Y10S 460/905
USPC .......................................................... 701/50
See application file for complete search history.

(56) References Cited

U.S. PATENT DOCUMENTS

| | | | | |
|---|---|---|---|---|
| 6,205,384 | B1* | 3/2001 | Diekhans | A01D 41/127 172/4.5 |
| 2003/0066277 | A1 | 4/2003 | Behnke | |
| 2006/0020402 | A1* | 1/2006 | Bischoff | A01D 41/127 702/34 |
| 2010/0071329 | A1* | 3/2010 | Hindryckx | A01D 41/127 56/10.2 R |
| 2010/0217481 | A1* | 8/2010 | Baumgarten | A01D 41/127 701/33.4 |
| 2013/0102369 | A1* | 4/2013 | Johnson | A01D 41/127 460/1 |
| 2013/0317696 | A1* | 11/2013 | Koch | A01D 41/1272 701/33.1 |
| 2013/0332003 | A1* | 12/2013 | Murray | A01D 41/127 701/1 |
| 2014/0019018 | A1 | 1/2014 | Baumgarten et al. | |
| 2014/0169932 | A1* | 6/2014 | Farley | A01D 41/1217 414/813 |
| 2014/0236381 | A1* | 8/2014 | Anderson | A01D 75/00 701/1 |
| 2015/0088386 | A1* | 3/2015 | Neu | A01D 41/127 701/50 |
| 2015/0293068 | A1* | 10/2015 | Acheson | G01N 33/0098 702/137 |
| 2015/0293507 | A1* | 10/2015 | Burns | G05B 15/02 700/83 |
| 2016/0029559 | A1* | 2/2016 | Inoue | A01D 41/1272 56/10.2 G |

* cited by examiner

AUTOMATIC TUNING OF AN INTELLIGENT COMBINE

FIELD OF THE INVENTION

The invention relates to agricultural combines. More particularly the invention relates to automatic tuning of agricultural combines.

BACKGROUND

Currently, machine optimization programs for agricultural harvesters require a significant amount of operator input.

For example, in U.S. Pat. No. 8,406,964 B2, the operator determines which machine performance parameter is unsatisfactory (sub-optimal or not acceptable) and then manually steps through a machine optimization program, first identifying the sub optimal condition (grain loss, grain quality, tailings high, etc.) and then commanding the optimization program to determine what corrections would be appropriate to solve this problem. The optimization program then returns with a list of potential solutions and asks the operator to select which one he would like the machine to implement (i.e. for which machine setting the operator would like changed). The optimization program then makes the setting the operator selected, waits for an interval in order for the system to stabilize, and then asks the operator whether the new machine setting corrected the problem.

Similarly, in US 2014/0129048 A1, US 2012/0004812 A1, and US2014/0019018 the operator similarly identifies unsatisfactory machine performance parameters to a combine adjustment system and indicates to the system that he wishes it to employ strategies designed to improve those unsatisfactory machine performance parameters.

In all these cases, the operator indicates areas of machine operation in which he wishes improvement by interaction with an electronic display showing several sequential screens of information.

This process takes considerable time. It requires significant operator interaction. It prevents the operator from monitoring the field operations and being aware of his surroundings while he is interacting with machine optimization program.

What is needed is a system that will improve or maintain the performance of the combine with less operator interaction and distraction. It is an object of this invention to provide such a system.

SUMMARY OF THE INVENTION

In accordance with a first aspect of the invention, an automatic tuning system determines that an error condition (i.e. sub optimal performance) exists, automatically selects an appropriate change in a machine setting, automatically applies the change, automatically waits for the system to stabilize, and automatically decides whether or not the correction was sufficient, and if not, identifies a further change in the machine settings to solve the problem.

In accordance with another aspect of the invention, a method for automatically tuning an agricultural combine is provided, comprising steps of: receiving a signal from an operator of the agricultural combine indicating that current operation of the agricultural combine operation is acceptable; determining current performance parameters of the agricultural combine after the step of receiving; calculating a performance parameter error limit for each of the current performance parameters determined in the preceding step; again determining current performance parameters; comparing the again determined current performance parameters with the performance parameter error limits to thereby determine whether one or more of the again determined current performance parameters falls outside its associated performance parameter error limit; and if at least one of the again determined current performance parameters falls outside its associated performance parameter error limit as determined in the previous step, then calculating changes to machine settings of the agricultural combine that will bring the at least one of the again determined current performance parameters back within its associated performance parameter error limit.

The method may further comprise the step of determining current machine settings before the step of calculating.

The current performance parameters may comprise at least one of a group consisting of grain yield, grain quality, and grain loss.

The current machine settings may comprise at least one of a group consisting of rotor speed, upper sieve position, lower sieve position, fan speed, vehicle speed, threshing gap, threshing load, and header height.

The current machine settings may be indicated by at least one of a group consisting of a rotor speed sensor, a threshing gap sensor, a grain yield sensor, a tailings sensor, a threshing load sensor, a grain quality sensor, a straw quality sensor, a header height sensor, a first shoe loss sensor, a second shoe loss sensor, a separator loss sensor and a feederhouse mass flow sensor.

The first shoe loss sensor may be disposed on the left side of a cleaning shoe, and the second shoe loss sensor may be disposed on the right side of the cleaning shoe.

The step of comparing the again determined current performance parameters with the performance parameter error limits may further comprise the step of sequentially comparing each of the again determined current performance parameters with its associated performance parameter error limit, to thereby sequentially determine whether said each of the again determined current performance parameters falls outside its associated performance parameter error limit.

In accordance with another aspect of the invention, a method for automatically tuning an agricultural combine is provided comprising the steps of: transmitting an electronic signal to an ECU indicating that a current performance of the agricultural combine is acceptable; receiving the electronic signal by the ECU; determining in the ECU current performance parameters of the agricultural combine after the step of receiving; calculating in the ECU a performance parameter error limit for each of the current performance parameters determined in the previous step; again determining current performance parameters in the ECU; comparing in the ECU the again determined current performance parameters with the performance parameter error limits to thereby determine whether one or more of the again determined current performance parameters falls outside its associated performance parameter error limit; and if at least one of the again determined current performance parameters falls outside its associated performance parameter error limit in step "f", then calculating in the ECU changes to machine settings of the agricultural combine that will bring the at least one of the again determined current performance parameters back within its associated performance parameter error limit.

The ECU may comprise one or more ECUs connected together in a network.

The method may further comprise a step of determining current machine settings before the step of calculating.

The current performance parameters may comprise at least one of a group consisting of grain yield, grain quality, grain loss.

The current machine settings may comprise at least one of a group consisting of rotor speed, upper sieve position, lower sieve position, fan speed, vehicle speed, threshing gap, threshing load, and header height.

The current machine settings may be indicated by at least one of a group consisting of a rotor speed sensor connected to the ECU, a threshing gap sensor connected to the ECU, a grain yield sensor connected to the ECU, a tailings sensor connected to the ECU, a threshing load sensor connected to the ECU, a grain quality sensor connected to the ECU, a straw quality sensor connected to the ECU, a header height sensor connected to the ECU, a first shoe loss sensor connected to the ECU, a second shoe loss sensor connected to the ECU, a separator loss sensor connected to the ECU and a feederhouse mass flow sensor connected to the ECU.

The first shoe loss sensor may be disposed on the left side of a cleaning shoe, and the second shoe loss sensor may be disposed on the right side of the cleaning shoe.

The step of comparing in the ECU the again determined current performance parameters with the performance parameter error limits may further comprise the step of sequentially comparing each of the again determined current performance parameters with its associated performance parameter error limit, to thereby sequentially determine whether said each of the again determined current performance parameters falls outside its associated performance parameter error limit.

DETAILED DESCRIPTION

Figure 1:
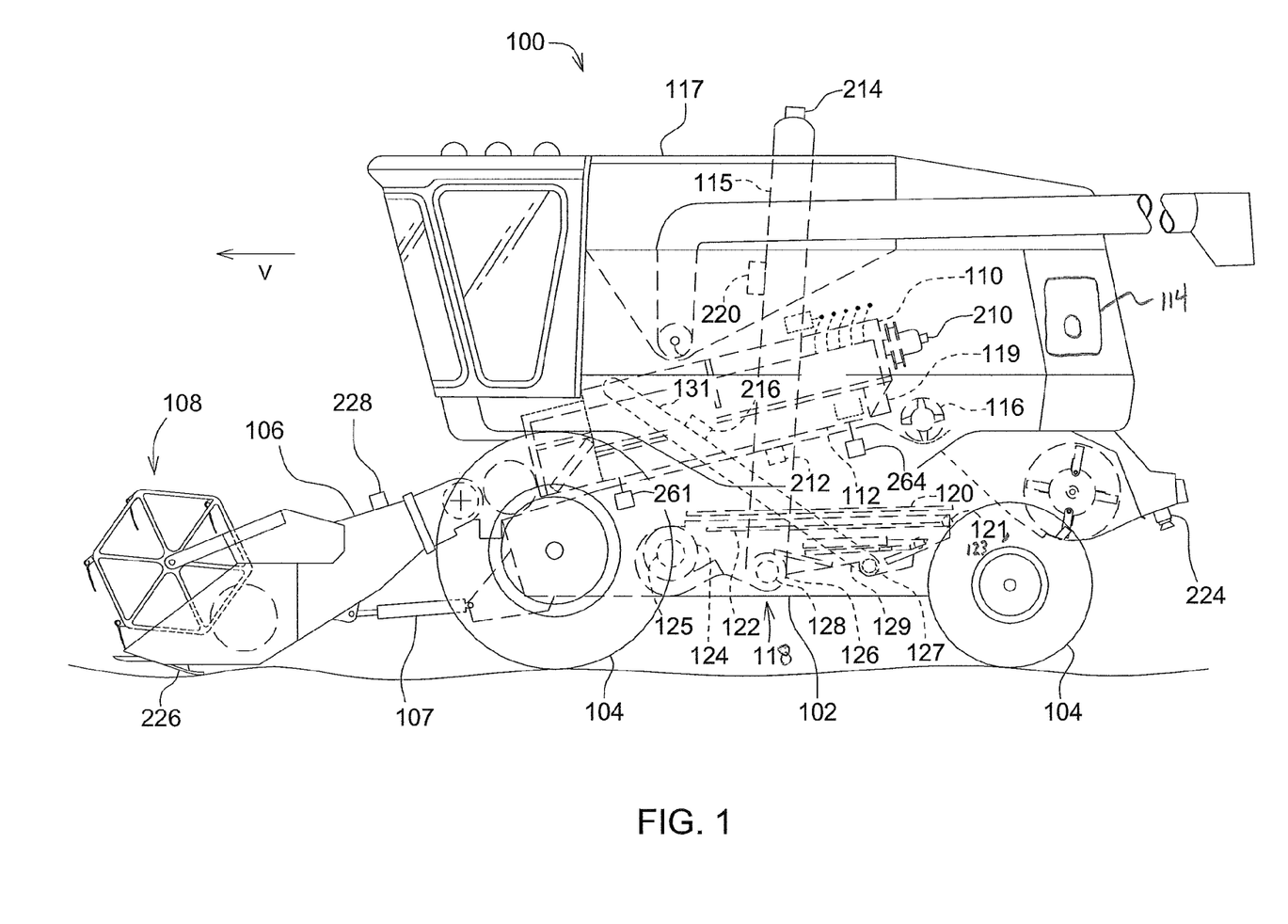
FIG. 1 is a left side view of an agricultural harvester in accordance with the present invention.

Referring to FIG. 1, an agricultural harvester 100, here shown as a combine, comprises a chassis 102 that is supported on wheels 104 to be driven over the ground and harvest crops. The wheels 104 may engage the ground directly or they may drive endless tracks. A feederhouse 106 extends from the front of the agricultural harvester 100. Feederhouse lift cylinders 107 extend between the chassis of the agricultural harvester 100 and the feederhouse to raise and lower the feederhouse (and hence the agricultural harvesting head 108) with respect to the ground. An agricultural harvesting head 108 is supported on the front of the feederhouse 106. When the agricultural harvester 100 operates, it carries the feederhouse 106 through the field harvesting crops. The feederhouse 106 conveys crop gathered by the agricultural harvesting head 108 rearward and into the body of the agricultural harvester 100. Once inside the agricultural harvester 100, the crop is conveyed into separator which comprises a rotor 110 that is cylindrical and a threshing basket or threshing basket 112. The rotor 110 is driven in rotation by an internal combustion engine 114. The threshing basket 112 surrounds the rotor 110 and is stationary. Crop material is conveyed into the gap between the rotor 110 and the threshing basket 112 and is threshed and separated into a grain component and a MOG (material other than grain) component.

The MOG is carried rearward and released from between the rotor 110 and the threshing basket 112. It then is received by a re-thresher 116 where the remaining kernels of grain are released. The now-separated MOG is released behind the vehicle to fall upon the ground. A separator loss sensor 119 is disposed at the end of the rotor 110 and the threshing basket 112 to sense the quantity of grain that was carried to the rear of the separator.

Most of the grain separated in the separator (and some of the MOG) falls downward through apertures in the threshing basket 112. From there it falls into a cleaning shoe 118.

The cleaning shoe 118 has two sieves: an upper sieve 120, and a lower sieve 122. A fan 124 is provided at the front of the cleaning shoe to blow air rearward underneath the sieves. This air passes upward through the sieves and lifts chaff, husks, culm and other small particles of MOG (as well as a small portion of grain). The air carries this material rearward to the rear end of the sieves. A motor 125 drives the fan 124.

Most of the grain entering the cleaning shoe 118, however, is not carried rearward, but passes downward through the upper sieve 120, then through the lower sieve 122.

Of the material carried by air from the fan 124 to the rear of the sieves, smaller MOG particles are blown out of the rear of the combine. Larger MOG particles and grain are not blown off the rear of the combine, but fall off the cleaning shoe 118 and onto a shoe loss sensor 121 located on the left side of the cleaning shoe 118, and which is configured to detect shoe losses on the left side of the cleaning shoe 118, and on a shoe loss sensor 123 located on the right side of the cleaning shoe 118 and which is configured to detect shoe losses on the right side of the cleaning shoe 118.

The shoe loss sensor 121 provides a signal that is indicative of the quantity of material (which may include grain and MOG mixed together) carried to the rear of the cleaning shoe and falling off the left side of the cleaning shoe 118.

The shoe loss sensor 123 provides a signal that is indicative of the quantity of material (which may include grain and MOG mixed together) carried to the rear of the cleaning shoe when falling off the right side of the cleaning shoe 118.

Heavier material that is carried to the rear of the upper sieve 120 and the lower sieve 122 falls onto a pan and is then conveyed by gravity downward into an auger trough 127. This heavier material is called "tailings" and is typically a mixture of grain and MOG.

A tailings auger 129 is disposed in the auger trough 127 and carries the tailings to the right side of the agricultural harvester 100 and into a tailings elevator 131. The tailings elevator 131 carries the tailings upward and deposits them on a forward end of the rotor 110 to be re-threshed and separated.

The grain that passes through the upper sieve 120 and the lower sieve 122 falls downward into an auger trough 126. A clean grain auger 128 disposed in the auger trough 126 carries the material to the right side of the agricultural harvester 100 and deposits the grain in the lower end of the grain elevator 115. The grain lifted by the grain elevator 115 is carried upward until it reaches the upper exit of the grain elevator 115. The grain is then released from the grain elevator 115 and falls into a grain tank 117.

Figure 2:
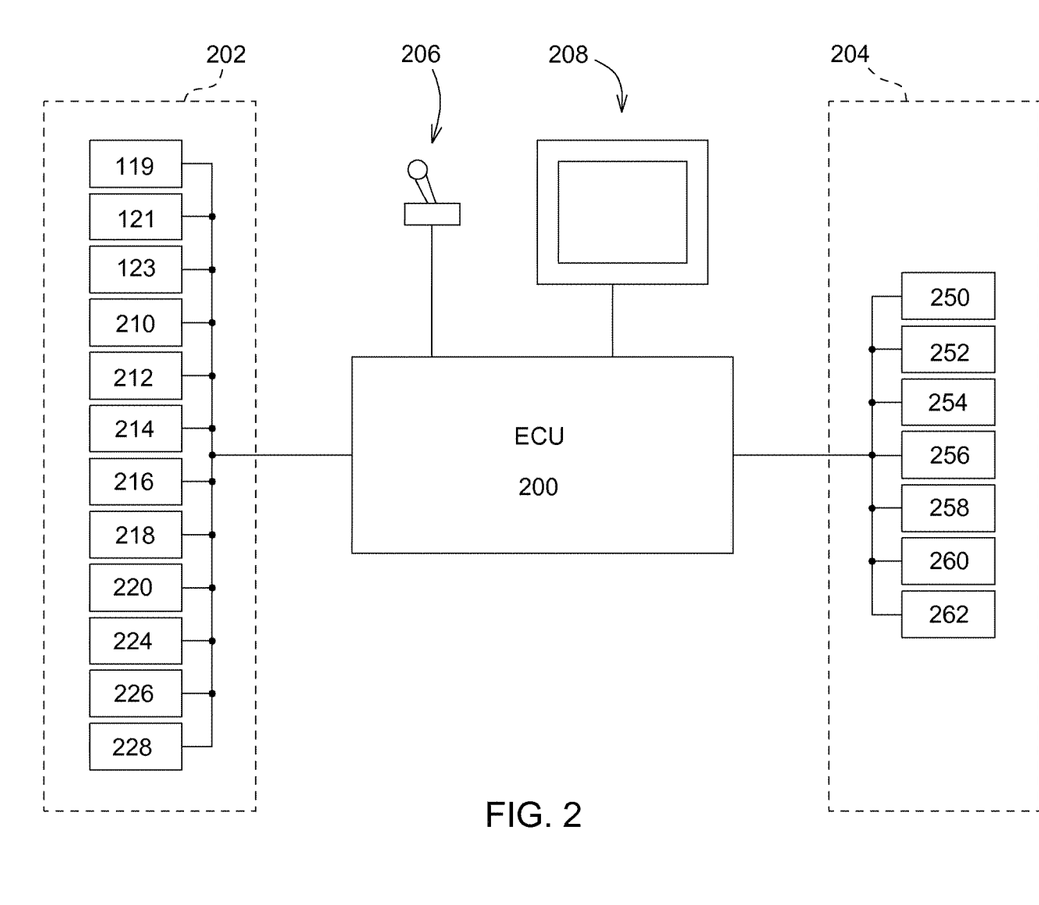
FIG. 2 is a schematic circuit diagram of a control system in accordance with the present invention.

Referring to FIG. 2, an electronic control unit (ECU) 200 is coupled to a plurality of sensors 202 and a plurality of controllers 204. The ECU 200 is also coupled to an operator input device 206 and a display device 208. The ECU 200 is configured to read each sensor of the plurality of sensors 202, and to drive each controller of the plurality of controllers 204. The ECU 200, the plurality of sensors 202, the plurality of controllers 204, the operator input device 206, and the display device 208 comprise an electronic control system 209 for the agricultural harvester 100.

The ECU 200 comprises an ALU, a memory circuit, and a driver circuit. The ALU is configured to execute programmed digital instructions that are stored in the memory circuit. These instructions indicate to the ECU 200 how to responsively read the plurality of sensors 202, how to perform internal mathematical computations, and how to drive each controller of the plurality of controllers 204.

In the embodiment illustrated herein, a single ECU 200 is shown for convenience of illustration. The single ECU 200 graphically represents a single ECU or multiple ECUs that are coupled together in a network to communicate with each other and to collectively perform the functions described herein.

In one arrangement this network is a wired network. In another arrangement it is a wireless network. In another arrangement is a mixed wired and wireless network. In one arrangement it is a controller area network (CAN) and the individual ECUs communicate with each other over a CAN bus.

The operator input device 206, is be one or more of a keyboard, button, touchscreen, lever, handle, knob, dial, potentiometer, variable resistor, shaft encoder, or other device or combination of devices that are coupled to the ECU 200 and configured to indicate to the ECU 200 a desired operator command.

The display device 208 may be a CRT, LCD, plasma display, or other display technology or combination of display technologies configured to provide the user with visual indicia as commanded by the ECU 200.

The plurality of sensors 202 comprise the separator loss sensor 119, the shoe loss sensor 121, the shoe loss sensor 123, a rotor speed sensor 210, a threshing gap sensor 212, a grain yield sensor 214, a tailings sensor 216, a threshing load sensor 218, grain quality sensor 220, straw quality sensor 224, header height sensor 226, and feederhouse mass flow sensor 228.

The rotor speed sensor 210 provides signal indicative of the speed of the rotor. The faster the rotor 110 rotates, the more quickly it threshes crop. At the same time, as the rotor turns faster, it damages a larger proportion of the grain. Thus, by varying the rotor speed, the proportion of grain threshed can change as well as the proportion of damaged grain.

In one arrangement, the rotor speed sensor 210 can be a shaft speed sensor and measure the speed of the rotor 110 directly. In another arrangement it can be combination of other sensors that cumulatively provide a signal indicative of the speed of the rotor, such as a hydraulic fluid flow rate sensor for fluid flow through a hydraulic motor that drives the rotor 110, or an internal combustion engine 114 speed sensor in conjunction with another signal that indicates a selected gear ratio of a gear train between the internal combustion engine 114 and the rotor 110, or a swash plate position sensor and shaft speed sensor of a hydraulic motor that provides hydraulic fluid to a hydraulic motor driving the rotor 110.

The threshing gap sensor 212 provides a signal indicative of a gap between the rotor 110 and the threshing basket 112. As this gap is reduced, the crop is threshed more vigorously, reducing the separator loss. At the same time, a reduced gap produces greater damage to grain. Thus, by changing the threshing gap the separator loss can be changed as well as the amount of grain that is damaged.

The grain yield sensor 214 provides a signal indicative of the flow rate of clean grain. In one arrangement, it includes an impact sensor that is disposed adjacent to an outlet of the grain elevator 115, where the grain enters the grain tank 117. In this arrangement, grain carried upward in the grain elevator 115 impacts the grain yield sensor 214 with the force equivalent to the mass flow rate of grain into the grain tank. In an alternative arrangement, the grain yield sensor 214 is coupled to a motor (not shown) driving the grain elevator 115 and provides a signal indicative of the load on the motor. The load on the motor is indicative of the quantity of grain carried upward by the grain elevator 115. In one arrangement, the load on the motor can be determined by measuring the current through and/or voltage across the motor (in the case of an electric motor). In another arrangement, the motor can be a hydraulic motor, and a load of the motor can be determined by measuring the fluid flow rate to the motor and/or the hydraulic pressure across the motor.

The tailings sensor 216 and the grain quality sensor 220 each provide a signal indicative of the quality of the grain. The signal may be one or more of the following: a signal indicative of the amount of proportion of grain, a signal indicative of the amount or proportion of damaged grain (e.g. cracked or broken kernels of grain), a signal indicative of the amount or proportion of MOG mixed with the grain (which can be further characterized as an amount or proportion of different types of MOG, such as light MOG or heavy MOG), and the signal indicative of an amount or proportion of unthreshed grain.

In one arrangement, the grain quality sensor 220 is disposed in a grain flow path between the clean grain auger 128 and the grain tank 117. More particularly, the grain quality sensor 220 is disposed adjacent to the grain elevator 115. More particularly, grain quality sensor 220 is disposed to receive samples of grain from the grain elevator 115 and to sense characteristics of grain sampled therefrom.

In one arrangement, the tailings sensor 216 is disposed in a grain flow path between the tailings auger 129 and the forward end of the rotor 110 where the tailings are released from the tailings elevator 131 and are deposited between the rotor 110 and the threshing basket 112 for re-threshing. More particularly, the tailings sensor 216 is disposed adjacent to the tailings elevator 131. More particularly, the tailings sensor 216 is disposed receive samples of grain from the tailings elevator 131 and to sense characteristics of grain sample therefrom.

The threshing load sensor 218 provides a signal indicative of the threshing load (i.e. the load applied to the rotor 110). In one arrangement, the threshing load sensor 218 comprises a hydraulic pressure sensor disposed to sense the pressure in a motor driving the rotor 110. In another arrangement (in the case of a rotor 110 that is driven by a belt and sheave), the threshing load sensor 218 comprises a sensor disposed to sense the hydraulic pressure applied to a variable diameter sheave at a rear end of the rotor 110 and by which the rotor 110 is coupled to and driven by a drive belt. In another arrangement, the threshing load sensor 218 may comprise a torque sensor disposed to sense a torque in a shaft driving the rotor 110.

In one arrangement, the tailings sensor 216 and the grain quality sensor 220 each comprise a digital camera configured to receive a picture of the grain sample, and an ECU configured to interpret the picture and determine the quality of the grain sample. In particular, the ECU is configured to determine the signals mentioned in the previous paragraph by classifying the picture taken by the camera. Examples of such a camera arrangement can be seen in US 2014/0050364 (A1), US 2009/0125197 (A1), US 2009/0258684 (A1), and US 2008/0186487 (A1).

The straw quality sensor 224 provides at least one signal indicative of the quality of straw (e.g. MOG) leaving the agricultural harvester 100. "Quality of straw" means a physical characteristic (or characteristics) of the straw and/or straw windrows that accumulate behind the agricultural harvester 100. In certain regions of the world, straw, typically gathered in windrows is later gathered and either sold or used. The length of the straw is a factor in determining its value. The dimensions (height and width) of the straw windrow are also a factor in determining its value.

For example, short straw is particularly valuable for use as animal feed. Long straw is particularly valuable for use as animal bedding. Long straw permits tall, open, airy windrows to be formed. These windrows dry faster in the field and (due to their height above the ground) are lifted up by balers with less entrained dirt and other contaminants from the ground.

In one arrangement, the straw quality sensor 224 comprises a camera directed towards the rear of the combine to take a picture of the straw as it exits the combine and is suspended in the air falling toward the ground or to take a picture of the windrow as it is created by the falling straw. The straw quality sensor 224 may further comprise an ECU configured to retrieve the image from the camera, process it, and characterize the straw length or characterize the dimensions of the windrow created by the straw on the ground behind the agricultural harvester 100. In another arrangement, the straw quality sensor 224 comprises a range detector, such as a laser scanner or ultrasonic sensor similarly directed toward the straw and from which signal the straw length or straw windrow dimensions can be determined.

The header height sensor 226 provides a signal indicative of the height of the agricultural harvesting head 108 with respect to the ground. In one arrangement, the header height sensor 226 comprises a rotary sensor element such as a shaft encoder, potentiometer, or a variable resistor to which is coupled an elongate arm. The remote end of the arm drags over the ground, and as the agricultural harvesting head 108 changes in height, the arm changes its angle and rotates the rotary sensor element. In another arrangement, the header height sensor 226 comprises an ultrasonic or laser rangefinder.

The feederhouse mass flow sensor 228 provides a signal indicative of the thickness of the crop mat that is drawn into the feederhouse and thence into the agricultural harvester 100 itself. Academics have determined that a correlation exists between crop mass and crop yield (i.e. grain yield). The ECU 200 is configured to alternatively calculate the grain yield by combining the signal from the header height sensor 226 and the signal from the feederhouse mass flow sensor 228 together with agronomic tables stored in memory circuits of the ECU 200. This arrangement can be substituted for the signal from the grain yield sensor 214 to provide a signal indicative of the flow rate of clean grain.

The plurality of controllers 204 comprise an upper sieve controller 250, a lower sieve controller 252, a rotor speed controller 254, a fan speed controller 256, a vehicle speed controller 258, a threshing gap controller 260, and a header height controller 262.

The upper sieve controller 250 is coupled to the upper sieve 120 to change the angle of individual sieve elements (slats) that comprise the upper sieve 120. By changing the position (angle) of the individual sieve elements, the amount of air that passes through the upper sieve 120 can be varied to increase or decrease (as desired) the vigor with which the grain is sieved.

The lower sieve controller 252 is coupled to the lower sieve 122 to change the angle of individual sieve elements (slats) that comprise the lower sieve 122. By changing the position (angle) of the individual sieve elements, the amount of air that passes through the lower sieve 122 can be varied to increase or decrease (as desired) the vigor with which the grain is sieved.

The rotor speed controller 254 is coupled to variable drive elements disposed between the internal combustion engine 114 and the rotor 110. These variable drive elements can include gearboxes, gear sets, hydraulic pumps, hydraulic motors, electric generators, electric motors, sheaves with a variable working diameter, belts, shafts, belt variators, IVTs, CVTs and the like (as well as combinations thereof). The rotor speed controller 254 controls the variable drive elements to vary the speed of the rotor 110.

The fan speed controller 256 is coupled to variable drive elements disposed between the internal combustion engine 114 and the fan 124 to drive the fan 124. These variable drive elements can include gearboxes, gear sets, hydraulic pumps, hydraulic motors, electric generators, electric motors, sheaves with a variable working diameter, belts, shafts, belt variators, IVT's, CVT's and the like (as well as combinations thereof). The fan speed controller 256 controls the variable drive elements to vary the speed of the fan 124. These variable drive elements are shown symbolically in FIG. 1 as motor 125.

The vehicle speed controller 258 is coupled to variable drive elements disposed between the internal combustion engine 114 and one or more of the wheels 104. These variable drive elements can include hydraulic or electric motors coupled to the wheels 104 to drive the wheels 104 in rotation. The vehicle speed controller 258 controls the variable drive elements, which in turn control the speed of the wheels 104 by varying a hydraulic or electrical flow through the motors that drive the wheels 104 in rotation and/or by varying a gear ratio of the gearbox coupled between the motors and the wheels 104. The wheels 104 may rest directly on the ground, or they may rest upon a recirculating endless track or belt which is disposed between the wheels and the ground.

The threshing gap controller 260 is drivingly coupled to one or more threshing gap actuators 261, 264 that are coupled to the threshing basket 112 to change the gap between the rotor 110 and the threshing basket 112. Alternatively the threshing gap actuators 261 are coupled to the threshing basket 112 to change the position of the threshing basket 112 with respect to the rotor 110. The actuators may comprise hydraulic or electric motors of the rotary-acting or linear-acting varieties.

The header height controller 262 is drivingly coupled to valves (not shown) that control the flow of hydraulic fluid to and from the feederhouse lift cylinders 107. The header height controller 262 is configured to selectively raise and lower the feederhouse (and hence the agricultural harvesting head 108).

Figure 3:
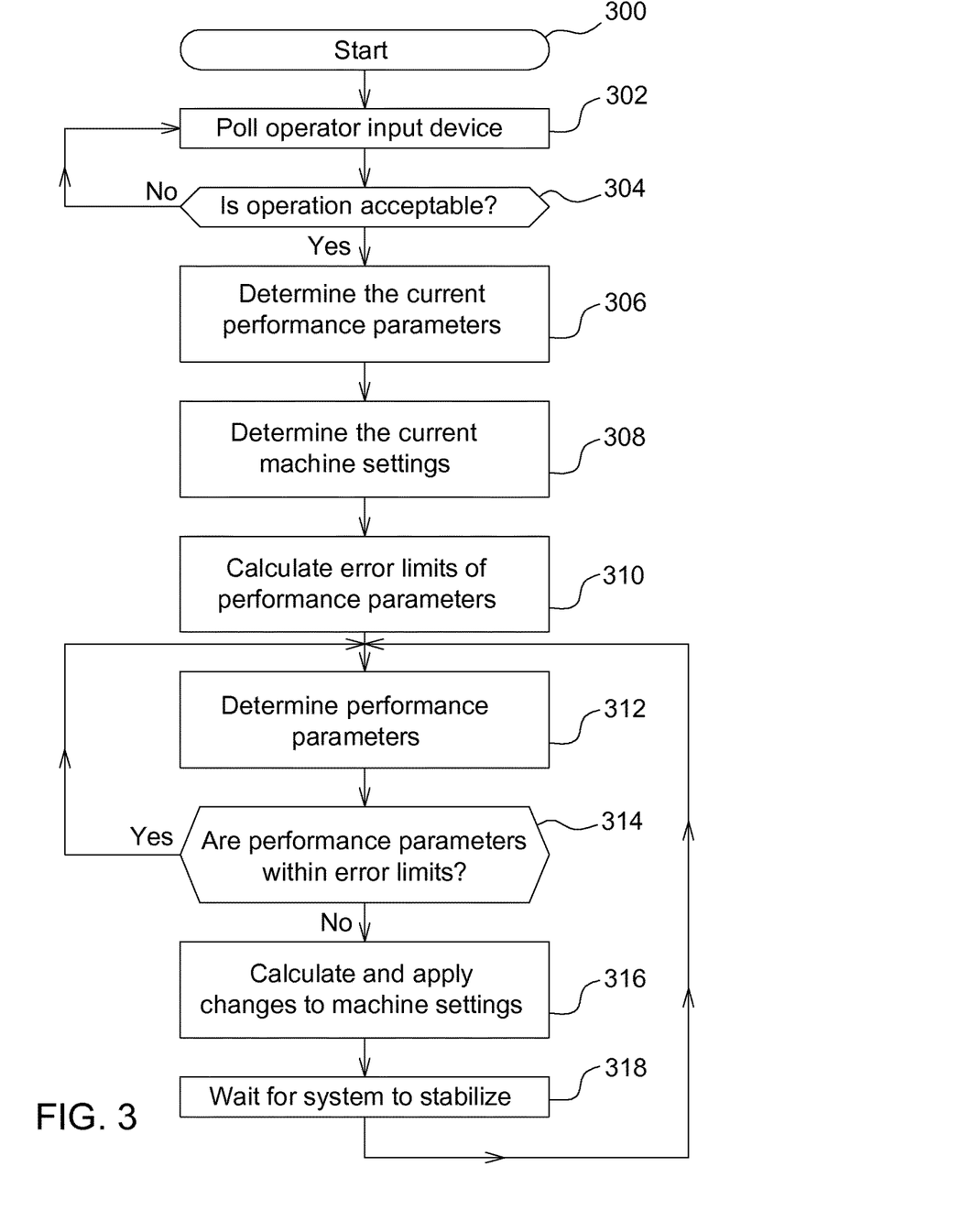
FIG. 3 is a flowchart of the control system in accordance with the present invention.

FIG. 3 is a flowchart of a process performed by the electronic control system 209. The process described in FIG. 3 is stored as a series of digital instructions in the memory circuit of the ECU 200. The ECU 200 retrieves these digital instructions and executes them, causing the electronic control system 209 to perform the steps described below.

In step 300, the process starts.

In step 302, the ECU 200 polls the operator input device 206 to determine whether the operator has indicated that the current operational performance of the agricultural harvester 100 is acceptable, and therefore should be maintained.

In step 304, the ECU 200 determines whether the operator has indicated that the operation is acceptable in step 302. If the current operation of the agricultural harvester 100 is acceptable, the ECU 200 branches to step 306. If the current operation of the agricultural harvester 100 is not acceptable, the ECU branches to step 302 and again polls the operator input device 206.

In step 306, the ECU determines the current performance parameters of the agricultural harvester 100. These performance parameters may comprise separator loss (indicated by the separator loss sensor 119), shoe loss (indicated by the shoe loss sensor 121 and/or the shoe loss sensor 123), grain quality (indicated by the grain quality sensor 220), grain yield (indicated by the grain yield sensor 214), tailings volume (indicated by the tailings sensor 216), tailings quality (indicated by the tailings sensor 216), and straw quality (indicated by the straw quality sensor 224).

Grain quality may comprise an absolute (or relative) quantity of broken grain. Grain quality may comprise an absolute (or relative) quantity of MOG mixed with the grain (i.e. how "dirty" the grain is). Grain quality may comprise an absolute (or relative) quantity of MOG mixed with the grain having one or more particular characteristics, such as MOG size (e.g. dimensions or volume), MOG shape (e.g. round, oval, long, slender), MOG mass, or MOG source (e.g. MOG from stalks, MOG from leaves, MOG from husks, or MOG from the cob). Grain quality may comprise an absolute (or relative) quantity of grain having one or more particular characteristics, such as grain color, grain size/mass, broken or cracked grain, or grain shape. Grain quality may comprise other characteristics of the grain as well.

Tailings quality may comprise an absolute (or relative) quantity of broken grain. Tailings quality may comprise an absolute (or relative) quantity of MOG mixed with the grain in the tailings stream having one or more particular characteristics, such as MOG size (e.g. dimensions, or volume), MOG shape (MOG from stalks, MOG from leaves, MOG from husks, or MOG from the cob). Tailings quality may comprise an absolute (or relative) quantity of partially threshed grain. Tailings quality may comprise other characteristics of the tailings as well.

In step 308, the ECU determines the current machine settings. The machine settings include the vehicle ground speed setting, the height setting of the agricultural harvesting head 108 above the ground (or the height of the agricultural harvesting head 108 with respect to the agricultural harvester 100), the speed setting of the fan 124, the position setting of the upper sieve 120, the position setting of the lower sieve 122, the setting of the threshing gap (i.e. the space between the rotor 110 and the threshing basket 112), and the speed setting of the rotor 110. Each setting of the current machine settings can be an actual physical setting, such as the setting of the threshing gap, the position setting of the lower sieve, or the position setting of the upper sieve, or each setting can be a target value, such as engine speed, vehicle ground speed other values which are not set, but which is actively controlled by a feedback control loop. In the latter case, the current machine setting is a target setting of a feedback control loop.

In step 310, the ECU determines at least one error limit for each of the performance parameters. This at least one error limit may be an upper threshold for the performance parameter, a lower threshold for the performance parameter, or both an upper threshold and a lower threshold. The at least one error limit for each of the performance parameters is based at least upon the current performance parameters determined in step 306.

For example, if the operator indicated that the operation was acceptable (in step 304) when the cracked grain current performance parameter was 1% (i.e. 1% of all the harvested grain is cracked grain), the system could establish an upper threshold of cracked grain that is slightly above the 1% cracked grain current performance parameter, for example 1.5%. Alternatively, if the operator indicated that the operation was acceptable when the cracked grain current performance parameter was 5%, the system could establish an upper threshold of cracked grain that is slightly above the 5% cracked grain current performance parameter, for example 5.5%. Thus, the error limits are a function of (e.g. derived from) the current performance parameters that the system determined when the operator indicated that the current performance was acceptable.

After executing step 310, the system proceeds to execute step 312. In step 312, the system recalculates the performance parameters. This is necessary, since the system functions to maintain the performance parameters within the error limits, and since the performance parameters change as crop conditions and operating conditions change during harvesting. As the agricultural harvester 100 is operated, the performance parameters may improve over time, they may stay the same, or they may get worse over time.

After executing step 312, the system proceeds to execute step 314. In step 314, the system compares the performance parameters re-calculated in step 312 with the error limits calculated in step 310.

If all the performance parameters are within the error limits calculated in step 312, the operation of the agricultural harvester 100 is acceptable and the system branches from step 314 back to step 312.

In step 314, the system determines that one or more of the performance parameters is not within the error limits (e.g. if it exceeds the error limits), then the system proceeds to execute step 316.

In step 316, the system calculates a change in one or more machine settings that will bring the erroneous performance parameter (or parameters) that has exceeded its error limit (or error limits) back within the error limit or limits calculated.

The system may calculate this change in any a variety of methods. For example, the system may comprise an internal rule base to which it refers in order to determine the most appropriate action to bring the erroneous performance parameters back within their error limits. Alternatively, it may comprise an algorithm that combines one or more of the current performance parameters, the error limits, the type of crop being harvested, or the machine settings of the agricultural harvester 100, weighting each of these factors, as appropriate, and based upon the particular construction of the agricultural harvester 100 in question. The particular method by which the system determines the appropriate action forms no part of this invention.

Having calculated a change in one or more machine settings that will bring the erroneous performance parameter (or parameters) back within its error limit or limits, the system applies these new machine settings to the agricultural harvester 100 and proceeds to execute step 318.

In step 318, the system waits for the agricultural harvester 100 to stabilize at these new machine settings.

Once the system has stabilized, the system proceeds to execute step 312 and again determines the performance parameters.

The Figures herein illustrate one embodiment of the invention. The invention is not limited to the illustrated embodiment, however. To one skilled in the art of agricultural harvester design and operation, other embodiments of the invention are also possible.

We claim:

1. A method for automatically tuning an agricultural combine, comprising steps of:
   receiving a signal from an operator of the agricultural combine indicating that current operation of the agricultural combine operation is acceptable;
   determining and storing current performance parameters of the current operation of the agricultural combine indicated as being acceptable;
   determining and storing machine settings providing the current performance parameters of the current operation of the agricultural combine indicated as being acceptable, the determined and stored machine settings serving as baseline machine settings, the machine settings comprising at least two of a group consisting of rotor speed, a upper sieve position, lower sieve position, fan speed, threshing gap, threshing load and header height;
   calculating a performance parameter error limit for each of the determined current performance parameters;
   again determining current performance parameters;
   comparing the again determined current performance parameters with the performance parameter error limits to thereby determine whether one or more of the again determined current performance parameters falls outside its associated performance parameter error limit; and
   if at least one of the again determined current performance parameters falls outside its associated performance parameter error limit as determined in the previous step, then calculating changes to current machine settings of the agricultural combine based upon the previously determined and stored baseline machine settings that will bring the at least one of the again determined current performance parameters back within its associated performance parameter error limit.

2. The method of claim 1, wherein the step of comparing the again determined current performance parameters with the performance parameter error limits further comprises the step of sequentially comparing each of the again determined current performance parameters with its associated performance parameter error limit, to thereby sequentially determine whether said each of the again determined current performance parameters falls outside its associated performance parameter error limit.

3. The method of claim 1, wherein the current performance parameters comprise at least one of a group consisting of grain yield, grain quality, and grain loss.

4. The method of claim 1, wherein the machine settings are indicated by at least one of a group consisting of a rotor speed sensor, a threshing gap sensor, a grain yield sensor, a tailings sensor, a threshing load sensor and a feederhouse mass flow sensor.

5. The method of claim 4, wherein the first shoe loss sensor is disposed on the left side of a cleaning shoe, and wherein the second shoe loss sensor is disposed on the right side of the cleaning shoe.

6. A method for automatically tuning an agricultural combine comprising the steps of:
   transmitting an electronic signal to an ECU indicating that a current performance of the agricultural combine is acceptable;
   receiving the electronic signal by the ECU;
   determining and storing in the ECU current performance parameters of the agricultural combine indicated as being acceptable;
   determining and storing machine settings providing the current performance parameters of the current operation of the agricultural combine indicated as being acceptable, the determined and stored machine settings serving as baseline machine settings, the machine settings comprising at least two of a group consisting of rotor speed, a upper sieve position, lower sieve position, fan speed, threshing gap, threshing load and header height;
   calculating in the ECU a performance parameter error limit for each of the determined current performance parameters;
   again determining current performance parameters in the ECU;
   comparing in the ECU the again determined current performance parameters with the performance parameter error limits to thereby determine whether one or more of the again determined current performance parameters falls outside its associated performance parameter error limit; and
   if at least one of the again determined current performance parameters falls outside its associated performance parameter error limit in the immediately previous step then calculating in the ECU changes to machine settings of the agricultural combine based upon the previously determined and stored baseline machine settings that will bring the at least one of the again determined current performance parameters back within its associated performance parameter error limit.

7. The method of claim 6, wherein the machine settings are indicated by at least one of a group consisting of a rotor speed sensor connected to the ECU, a threshing gap sensor connected to the ECU, a grain yield sensor connected to the ECU, a tailings sensor connected to the ECU, a threshing load sensor (218) connected to the ECU, a grain quality sensor connected to the ECU, a straw quality sensor connected to the ECU, a header height sensor (226) connected to the ECU, and a feederhouse mass flow sensor connected to the ECU.

8. The method of claim 7, wherein the first shoe loss sensor is disposed on the left side of a cleaning shoe, and wherein the second shoe loss sensor is disposed on the right side of the cleaning shoe.

9. The method of claim 6, wherein the ECU comprises one or more ECUs connected together in a network.

10. The method of claim 6, wherein the step of comparing in the ECU the again determined current performance parameters with the performance parameter error limits further comprises the step of sequentially comparing each of the again determined current performance parameters with its associated performance parameter error limit, to thereby sequentially determine whether said each of the again determined current performance parameters falls outside its associated performance parameter error limit.

11. The method of claim 6, wherein the current performance parameters comprise at least one of a group consisting of grain yield, grain quality, grain loss.

* * * * *